United States Patent
Ou et al.

(10) Patent No.: US 9,132,520 B2
(45) Date of Patent: Sep. 15, 2015

(54) MOUNTING MECHANISM FOR ASSEMBLING PLASTIC PLUG

(71) Applicant: HON HAI PRECISION INDUSTRY CO., LTD., New Taipei (TW)

(72) Inventors: Xiao-Lu Ou, Shenzhen (CN); Kai Xu, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 227 days.

(21) Appl. No.: 13/863,510

(22) Filed: Apr. 16, 2013

(65) Prior Publication Data

US 2013/0318759 A1    Dec. 5, 2013

(30) Foreign Application Priority Data

May 31, 2012   (CN) .................. 2012 2 0251872 U

(51) Int. Cl.
| | |
|---|---|
| B23P 19/04 | (2006.01) |
| B23P 19/027 | (2006.01) |
| B25B 27/02 | (2006.01) |
| B23P 19/10 | (2006.01) |

(52) U.S. Cl.
CPC ............... *B23P 19/04* (2013.01); *B23P 19/027* (2013.01); *B23P 19/10* (2013.01); *B25B 27/02* (2013.01); *Y10T 29/53796* (2015.01)

(58) Field of Classification Search
CPC .......... B23P 19/04; B23P 19/10; B23P 19/02; B23P 19/00; B23P 19/027; B23P 19/08; B23P 19/12; Y10T 29/53796; B25B 27/14; B25B 27/02; B30B 1/32; B30B 1/00; B30B 1/007
USPC ................... 29/244, 252, 251, 264, 271, 278; 269/52
See application file for complete search history.

(56) References Cited

U.S. PATENT DOCUMENTS

| | | | | |
|---|---|---|---|---|
| 303,400 | A | * | 8/1884 | Redlich .......................... 81/3.33 |
| 2,004,211 | A | * | 6/1935 | Munzinger ..................... 81/3.2 |
| 3,104,460 | A | * | 9/1963 | Wight ............................. 29/264 |
| 3,390,446 | A | * | 7/1968 | Ettorre ........................... 29/252 |
| 3,504,420 | A | * | 4/1970 | Shores ........................... 29/235 |
| 4,366,617 | A | * | 1/1983 | Nanstiel et al. ................ 29/727 |
| 4,369,662 | A | * | 1/1983 | Rieben et al. ............. 73/862.01 |
| 4,693,277 | A | * | 9/1987 | Bieber et al. .................... 138/89 |
| 4,734,972 | A | * | 4/1988 | Hawkins ...................... 29/426.4 |
| 5,165,470 | A | * | 11/1992 | Maekawa et al. ............... 165/76 |
| 5,255,717 | A | * | 10/1993 | Nelson et al. ................... 138/89 |
| 5,465,483 | A | * | 11/1995 | Fink et al. ................ 29/890.031 |

* cited by examiner

*Primary Examiner* — Lee D Wilson
*Assistant Examiner* — Tyrone V Hall, Jr.
(74) *Attorney, Agent, or Firm* — Novak Druce Connolly Bove + Quigg LLP

(57) ABSTRACT

A mounting mechanism includes a base, a pin movably mounted on the base, a first driving member, and a second driving member. The first driving member is connected to the pin and can drive the pin to move axially. The second driving member is connected to the pin, and can rotate the pin around its own axis, such that a plastic plug positioned on a free end of the pin can always be reliably inserted in a hole of a housing notwithstanding minor misalignments with the hole.

20 Claims, 3 Drawing Sheets

MOUNTING MECHANISM FOR ASSEMBLING PLASTIC PLUG

BACKGROUND

1. Technical Field

The present disclosure relates to mounting mechanisms, and particularly to a mounting mechanism for mounting a plastic plug in a hole of a housing.

2. Description of the Related Art

A mounting mechanism for mounting plastic plugs includes a cylinder and a pin connected to the cylinder. In use, a plastic plug is positioned on the pin, and the pin is moved by the cylinder, such that the plastic plug is pressed into a hole in a housing. However, if the pin is not precisely aligned with the hole, the plastic plug cannot be pressed in the hole smoothly or accurately. In that case, a position of the pin is required to be adjusted. Thus, mounting efficiency is relatively low.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
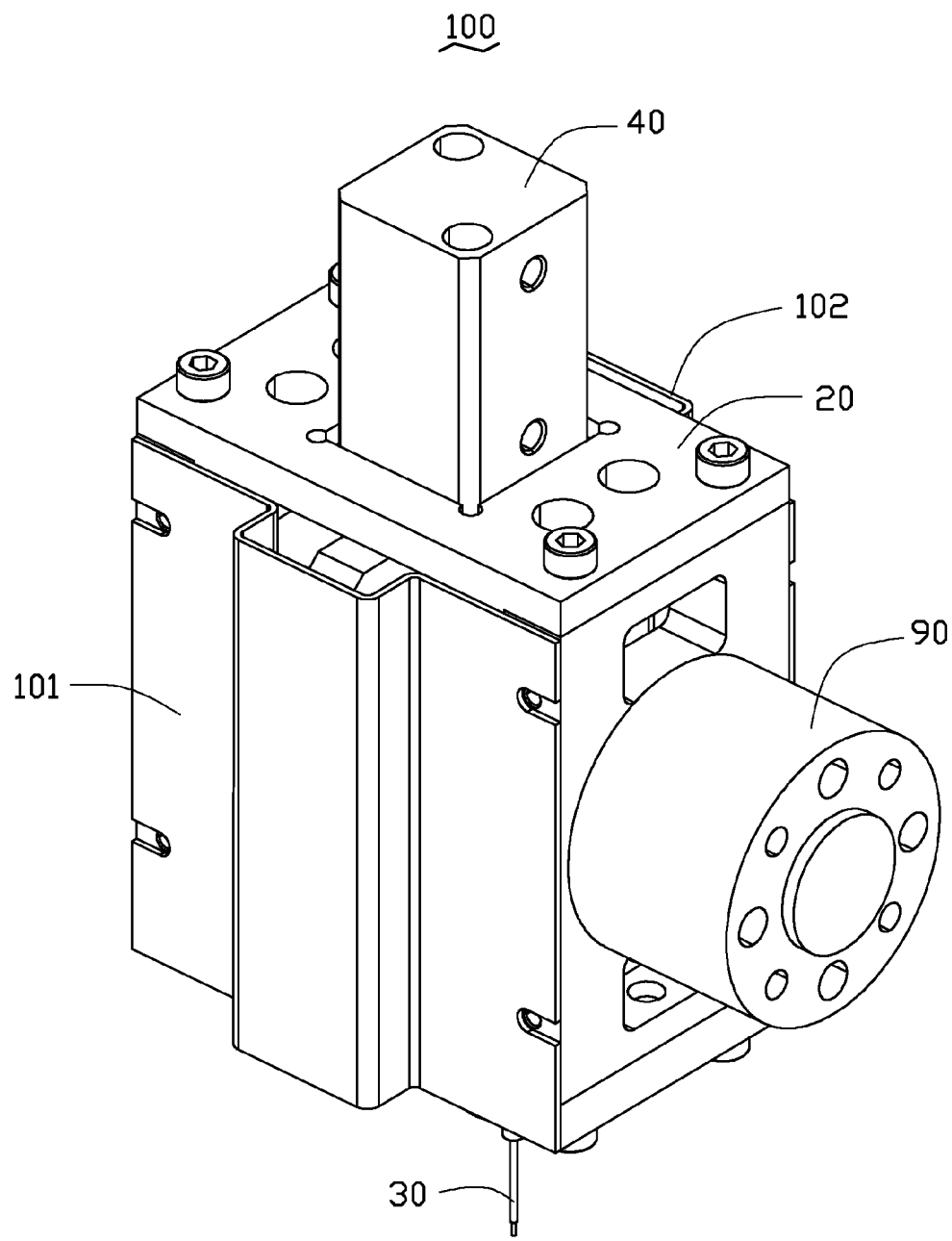
FIG. 1 is an assembled view of a mounting mechanism of one embodiment, in which the mounting mechanism includes a first cover and a second cover.
Figure 2:
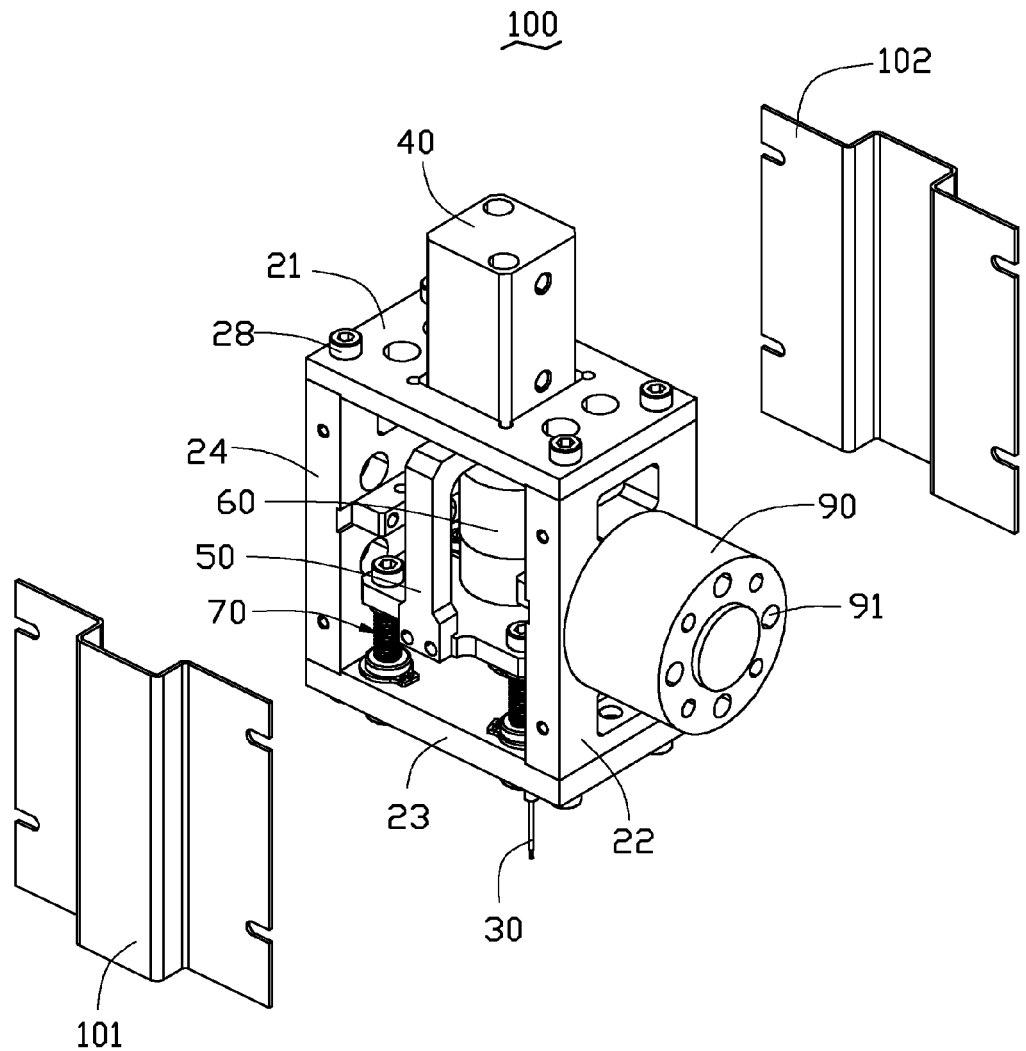
FIG. 2 is a partial, exploded view of the mounting mechanism in FIG. 1.
Figure 3:
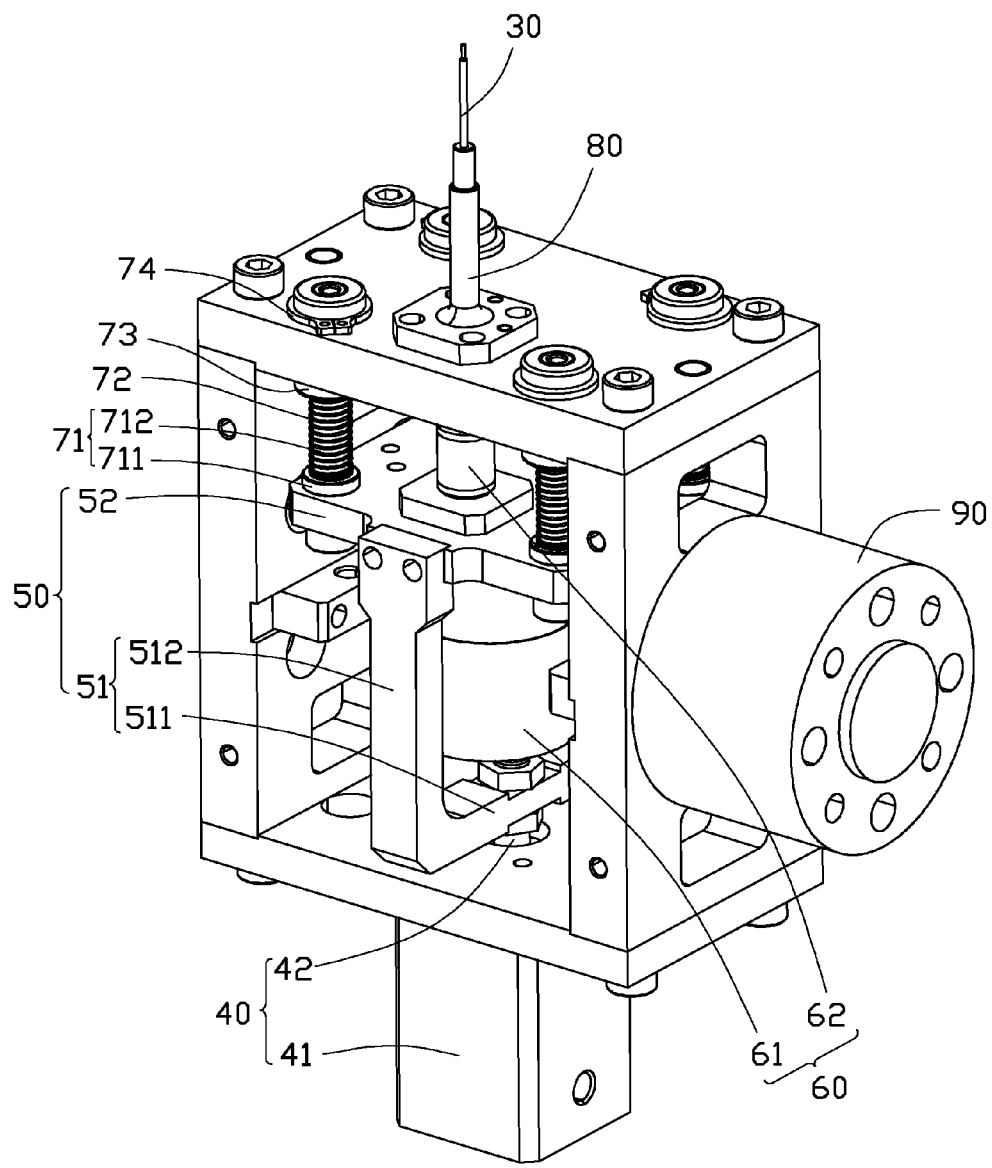
FIG. 3 is an enlarged, assembled view of mounting mechanism in FIG. 1 without the first cover and the second cover.

FIGS. 1 through 3 show an embodiment of a mounting mechanism 100 for mounting a plastic plug (not shown) in a hole of a housing (not shown). The mounting mechanism 100 includes a base 20, a pin 30, a first driving member 40, a support member 50, a second driving member 60, a plurality of connection assemblies 70, a guiding member 80, a connection seat 90, a first cover 101, and a second cover 102. The pin 30 is movably mounted on the base 20. The support member 50 is positioned in the base 20. The guiding member 80 is sleeved on the pin 30 and connected to the base 20. The first driving member 40 is fixedly placed on the base 20 and connected to the support member 50, and is capable of driving the pin 30 to move axially (in opposite directions along the axis of rotation of the pin 30). The second driving member 60 is placed on the support member 50 and capable of rotating the pin 30 around its own axis, such that the pin 30 can move axially and can rotate relative to the base 20.

The base 20 is a substantially rectangular housing, and includes a top wall 21, a first sidewall 22, a bottom wall 23, and a second sidewall 24. The first sidewall 22 and the second sidewall 24 interconnect the top wall 21 to the bottom wall 23. The top wall 21, the first sidewall 22, the bottom wall 23, and the second sidewall 24 are connected to each other by a plurality of fixing members 28.

The first driving member 40 is placed on the top wall 21. The first driving member 40 includes a body portion 41 and a first driving shaft 42 connected to the body portion 41. The first driving shaft 42 passes through the top wall 21, and then is connected to the support member 50. In an illustrated embodiment, the first driving member 40 is a cylinder.

The support member 50 is positioned in the base 20. The support member 50 includes a connection frame 51 and a support plate 52 connected to a bottom portion of the connection frame 51. In the illustrated embodiment, the connection frame 51 is substantially U-shaped, and includes a fixing pole 511 and two connection arms 512. The fixing pole 511 is fixedly connected to the first driving shaft 42. Each connection arm 512 extends substantially perpendicularly from one end of the fixing pole 511. The support plate 52 is substantially a rectangular plate, and is fixedly connected to the two connection arms 512.

The second driving member 60 includes a body portion 61 and a second driving shaft 62 connected to the body portion 61. The body portion 61 is placed on the support plate 52. The second driving shaft 62 passes through the support plate 52, and then is connected to the pin 30. In the illustrated embodiment, the second driving member 60 is a motor.

The pin 30 is movably mounted on the bottom wall 23 of the base 20. The guiding member 80 is sleeved on the pin 30, and is fixedly placed on the bottom wall 23.

The connection assemblies 70 interconnect the support plate 52 and the bottom wall 23. Each connection assembly 70 includes a guiding rod 71, an elastic member 72, a sleeve 73, and two latching rings 74. The guiding rod 71 includes a guiding portion 711 and a fixing portion 712 formed on one end of the guiding portion 711. The fixing portion 712 is fixedly connected to the support plate 52. The elastic member 72 is sleeved on the guiding portion 711. The sleeve 73 is sleeved on the other end of the guiding portion 711 away from the fixing portion 712. Opposite ends of the sleeve 73 define two positioning sleeves (not shown). The sleeve 73 passes through the bottom wall 23. One of the latching rings 74 is latched in each of the two positioning sleeves of the sleeve 73, and is positioned on two sides of the bottom wall 23 to position the sleeve 73 on the bottom wall 23. In the illustrated embodiment, the mounting mechanism 100 includes four connection assemblies 70, and the four connection assemblies 70 interconnect the support plate 52 with four corners of the bottom wall 23.

The connection seat 90 is substantially cylindrical, and is placed outside of the first sidewall 22. The connection seat 90 defines a plurality of connection holes 91.

The first cover 101 is mounted on one side of the base 20, and the second cover 102 is mounted on the other side of the base 20 opposite to the first cover 101, such that the support member 50 and the second driving member 60 are enclosed inside the base 20.

In use, the mounting mechanism 100 is connected to an effector end of a robot (not shown) by the connection seat 90. The mounting mechanism 100 is moved to a predetermined position by the robot, and the plastic plug is positioned on a free end of the pin 30. The first driving member 40 and the second driving member 60 are started or actuated, the first driving member 40 drives the support member 50 to move downwardly and the pin 30 to move axially, and the second driving member 60 rotates the pin 30 around its own axis. Thus, the plastic plug moved by the pin 30 becomes engaged in the hole of the housing by moving axially and by rotating around its own axis.

The movements along the axial direction thereof and the spinning direction of the pin 30 mean that, even if the pin 30 is slightly misaligned to the hole, the plastic plug can deform radially and elastically. Thus, the plastic plug can be reliably inserted in the hole of the housing, thereby requiring no adjustment of a position of the pin 30, and mounting efficiency is thus higher. In addition, the connection assembly 70 includes the presence of the elastic member 72, such that the pin 30 is effectively more resilient with respect of accommodating collisions when the plastic plug is inserted in the hole. Thus, the pin 30 is effectively not as brittle, and will not break off.

In other embodiments, the base 20 can be of other shapes, such as hexagonal. The first driving member 40 can be a linear motor, so long as the pin 30 can be moved axially by the first driving member 40. The second driving member 60 can be a pneumatic spindle, that is sufficient to allow the pin 30 to be rotated by the second driving member 60.

It is to be understood, however, that even through numerous characteristics and advantages of the disclosure have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A mounting mechanism, comprising:
   a base;
   a pin movably mounted on the base;
   a support member positioned in the base and comprising a connection frame and a support plate fixedly connected to the connection frame;
   a first driving member connected to the pin and being capable of driving the pin to move axially; and
   a second driving member connected to the pin and being capable of rotating the pin around an axis thereof, such that the pin is capable of moving axially and rotating around the axis thereof relative to the base;
   wherein the connection frame comprises a fixing pole and two connection arms.

2. The mounting mechanism of claim 1, wherein the first driving member is fixedly placed on the base and connected to the support member, and the second driving member is placed on the support member.

3. The mounting mechanism of claim 2, wherein the second driving member is placed on the support plate.

4. The mounting mechanism of claim 3, wherein each of the two connection arms extends substantially perpendicularly from one end of the fixing pole, the fixing pole is connected to the first driving member, and the support plate is fixedly connected to the two connection arms.

5. The mounting mechanism of claim 4, wherein the mounting mechanism further comprises a plurality of connection assemblies placed between the support plate and the base.

6. The mounting mechanism of claim 5, wherein each of the plurality of connection assemblies comprises a guiding rod and an elastic member sleeved on the guiding rod, the guiding rod comprises a guiding portion and a fixing portion formed on one end of the guiding portion, the fixing portion is fixedly connected to the support plate, and the elastic member is sleeved on the guiding portion between the support plate and the base.

7. The mounting mechanism of claim 6, wherein each of the plurality of connection assemblies further comprises a sleeve sleeved on the other end of the guiding portion away from the fixing portion, and the sleeve is fixedly placed on the base.

8. The mounting mechanism of claim 1, wherein the mounting mechanism further comprises a guiding member sleeved on the pin, and the guiding member is connected to the base.

9. The mounting mechanism of claim 1, wherein the base is a substantially rectangular housing, and comprises a top wall, a first sidewall, a bottom wall, and a second sidewall, the first sidewall and the second sidewall interconnect the top wall to the bottom wall.

10. The mounting mechanism of claim 1, wherein the first driving member comprises a cylinder.

11. The mounting mechanism of claim 1, wherein the second driving member comprises a motor.

12. A mounting mechanism, comprising:
    a base;
    a pin movably mounted on the base;
    a support member positioned in the base and comprising a connection frame and a support plate fixedly connected to the connection frame;
    a guiding member sleeved on the pin and connected to the base;
    a first driving member capable of driving the pin to move axially, the first driving member being fixedly placed on the base and connected to the support member; and
    a second driving member placed on the support member and capable of rotating the pin around an axis thereof,
    wherein such that the pin being capable of moving axially and rotating around the axis thereof relative to the base; and
    wherein the connection frame comprises a fixing pole and two connection arms.

13. The mounting mechanism of claim 12, wherein the second driving member is placed on the support plate.

14. The mounting mechanism of claim 13, wherein each of the two connection arms extends substantially perpendicularly from one end of the fixing pole, the fixing pole is connected to the first driving member, and the support plate is fixedly connected to the two connection arms.

15. The mounting mechanism of claim 14, wherein the mounting mechanism further comprises a plurality of connection assemblies placed between the support plate and the base.

16. The mounting mechanism of claim 15, wherein each of the plurality of connection assemblies comprises a guiding rod and an elastic member sleeved on the guiding rod, the guiding rod comprises a guiding portion and a fixing portion formed on one end of the guiding portion, the fixing portion is fixedly connected to the support plate, and the elastic member is sleeved on the guiding portion between the support plate and the base.

17. The mounting mechanism of claim 16, wherein each of the plurality of connection assemblies further comprises a sleeve sleeved on the other end of the guiding portion away from the fixing portion, and the sleeve is fixedly placed on the base.

18. The mounting mechanism of claim 12, wherein the base is a substantially rectangular housing, and comprises a top wall, a first sidewall, a bottom wall, and a second sidewall, the first sidewall and the second sidewall interconnect the top wall to the bottom wall.

19. The mounting mechanism of claim 12, wherein the first driving member comprises a cylinder.

20. The mounting mechanism of claim 12, wherein the second driving member comprises a motor.

* * * * *